Feb. 9, 1932.  W. E. HOKE  1,843,979
METHOD OF LAPPING CYLINDERS AND CONES
Filed Jan. 17, 1931
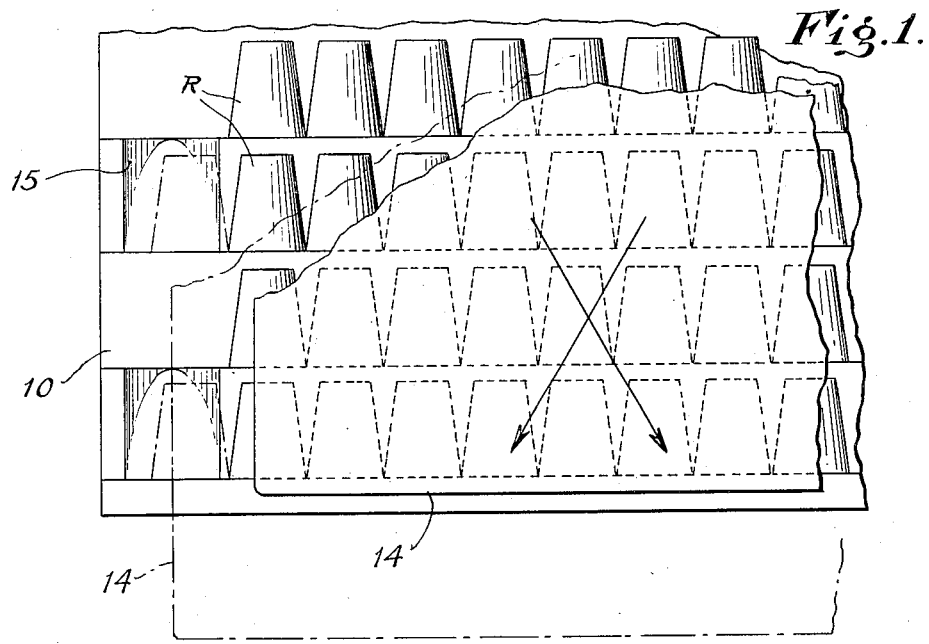
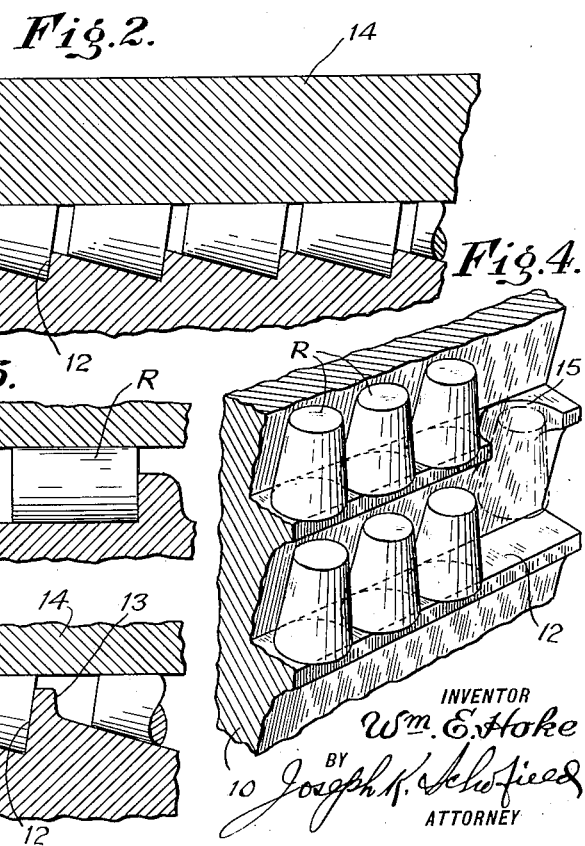

Patented Feb. 9, 1932

1,843,979

UNITED STATES PATENT OFFICE

WILLIAM E. HOKE, OF BALTIMORE, MARYLAND

METHOD OF LAPPING CYLINDERS AND CONES

Application filed January 17, 1931. Serial No. 509,397.

This invention relates to methods of lapping surfaces of revolution and end surfaces of frustums of cones and cylinders, and more particularly for lapping tapered rollers employed in antifriction bearings.

An object of the present invention is to provide an improved process for simultaneously lapping a plurality of frustums of cones or short cylinders upon their conical or cylindrical surfaces and simultaneously lapping their base surfaces.

Another object of the invention is to provide supporting means for the members being lapped in the form of a serrated plate, the serrations comprising parallel grooves within which the frustums or cylinders being lapped may be disposed, portions of the frustums and cylinders projecting above the surface of the plate and adapted to be engaged by a movable lap during the lapping operations.

A still further object of the invention is to simultaneously lap the conical or cylindrical surfaces and the end or base surfaces of a plurality of rollers in a manner assuring accurate roundness of the surfaces of revolution and that the base surface is normal to the axis of the conical or cylindrical surface.

And finally it is a feature of the invention to position the frustums or cylinders within the supporting member, while being lapped, from their base surfaces, the rollers being forced against and having their base surfaces lapped by surfaces on the supporting member, movement of a lap obliquely over the members effecting lapping operations upon the surfaces of revolution and forcing the rollers into lapping contact with the surface of the supporting member.

With these and other objects in view, my invention includes the features of construction and operation set forth in the following specification and illustrated in the accompanying drawings.

In the accompanying drawings annexed hereto and forming a part of this specification, I have shown my invention embodied and carried out in a device for lapping antifriction rollers, but it will be understood that the invention can be otherwise embodied and that the drawings are not to be construed as defining or limiting the scope of the invention, the claims appended to this specification being relied upon for that purpose.

In the drawings:

Figure 1 is a plan view of the means employed for carrying out the lapping operation.

Fig. 2 is a vertical sectional view taken through a portion of the means shown in Fig. 1.

Fig. 3 is a view similar to Fig. 2 showing a slightly modified form of the supporting plate for the frustums being lapped.

Fig. 4 is a perspective view of the supporting plate for the frustums showing some of the frustums in position for lapping operations; and Fig. 5 is a view similar to Figs. 2 and 3 but showing the supporting plate formed for operating upon short rollers of cylindrical form.

In the above mentioned drawings I have shown several embodiments of the device for carrying out the novel process which are now deemed preferable, but it is to be understood that changes and modifications may be made within the scope of the appended claims without departing from the spirit of the invention.

In antifriction bearings the rolling members of which are in the form of frustums of cones or short cylinders, it is essential that these members be extremely precise and identical in any one bearing. The roundness of cross section, straightness of their elements, flatness of the base surface, and the plane of the base being normal to the axis must all be of extreme precision. Also each frustum or cylinder must be identical to the others to a high precision in size, proportions, apex angle, etc. The surfaces, both conical or cylindrical, and the end or base surface of the rollers must be extremely smooth and uniform. The present invention therefore relates primarily to a method of and means for lapping a large number of tapered rollers or cylindrical rollers simultaneously upon their surfaces of revolution and their base surfaces in a manner to finally produce identical rollers lapped to a high degree of finish and precision.

Referring more in detail to the figure of the drawings, I provide a supporting plate 10 for rollers R being lapped having a plurality of parallel depressions or grooves 11. Along these grooves 11 are disposed a plurality of the rollers R to be lapped. The shape of the grooves 11 will depend upon the shape of the particular rollers being lapped. For conical rollers the surface of the groove will slope, as shown in Figs. 2 and 3, at such an angle and the groove will be of such depth that portions of the rollers R will project above the serrations and the outermost elements will be substantially in a plane. For cylindrical rollers the bottom surface of the grooves will be made parallel to the upper surface and of such depth that the rollers project partially above the upper surface of the plate.

Corresponding abutting surfaces or marginal edges 12 of the grooves 11 are formed to contact with the base or end surfaces of the rollers R. For convenience and to accommodate as many rows of rollers as possible the grooves 11 may be closely arranged, as shown most clearly in Fig. 2. In order to effect lapping operations upon the base or end surfaces of the rollers the abutting wall or surface 12 of the groove 11 may be raised as shown in Figs. 3 and 5 by means of the abutments 13 to permit all of the surface of the bases to be affected.

With the rollers R arranged substantially as above described and with the larger end surfaces of conical rollers contacting against corresponding abutting surfaces 12 of the grooves 11, a lap 14 is moved obliquely or diagonally over the rollers R. The directions of movement of this lap 14 are shown by the arrows in Fig. 1. Preferably movement of the lap 14 will be given in one oblique direction, the lap lifted from the rollers, returned to its initial upper position, lowered to again contact with the rollers and moved in the opposite oblique direction. This sequence of movements of the lapping member 14 may be continued for a period of time to completely lap all portions of the conical or cylindrical surfaces of the rollers R to a uniformly polished finish. As the grooves 11 in the supporting plate 10 are all formed of uniform shape and size for one set of rollers, the lapping operations will be concentrated upon those rollers that are slightly larger than others, as it is the larger ones that will project most above the supporting plate 10 and consequently support the weight of the lapping member 14.

The effect of these lapping movements by the member 14 is also to force the rollers R strongly against the surfaces 12 of the abutments 13 of the grooves 11 so that their end surfaces are simultaneously lapped to a plane or curved surface, depending upon the form of the surface 12 of the serrated member. This end or base surface will be lapped precisely perpendicularly to the axis of the surface of revolution of the rollers. The forcing of the rollers R against the abutting walls 12 of the grooves 11 also serves to hold these rollers R in positions with their axes standing normally to the grooves 11 while their surfaces of revolution are being lapped. Any usual lapping or abrasive compound may be employed preferably being applied in the form of paste or liquid to the lower surface of the lapping member 14 and to the abutting surface 12 of the grooves 11 in the supporting plate 10. Movements of the lapping member 14 being oblique relative to the grooves 11 cause the rollers to roll along the grooves 11 so that the lapping effect upon these surfaces will be uniform throughout the periphery and base surfaces. The lapping is effected by that component of the movement of the lapping member 14 which is parallel to the outer elements of the surfaces of revolution of the rollers.

The operation of lapping the rollers R may be made progressive upon a large number of similar rollers in the following manner. At opposite ends of adjacent grooves 11 of the supporting member 10 cut-out portions 15 are provided forming connecting recesses between the grooves 11. Only two of these cut-out portions are shown in Fig. 1. It will be understood, however, that there will be other cut-out portions at the opposite ends of each of the grooves 11 between those grooves for which a cut-out portion is shown. Such a cut-out portion at the opposite side of the grooves of the supporting plate 10 is shown in Fig. 4. With a supporting plate 10 thus made and recessed, the lapping movements of the upper member 14 may be such that rollers R will be caused to roll into these cut-away portions and, due to continued oblique movements of the lapping member 14, the roller forced through a cut-away portion 15 will be aligned with the rollers in the adjacent row. As there is a cut-away portion 15 for each groove 11 alternately at opposite sides of the supporting plate 10, a roller R will be moved progressively from the row in each groove 11 to the next row until it finally leaves the device at one end of the final groove. To facilitate this progressive movement of the rollers R along the rows and from groove to groove, the supporting plate 10 may be maintained tilted and all lapping operations carried out in an inclined plane. It will be understood also that the lapping movements of the upper member 14 may be varied in length, one longer movement being given to the member 14 in each oblique direction after a plurality of shorter movements in these directions. The progressive movements of the rollers R by their entering the cut-out portions 15 under these circumstances will take place only during the longer movements of the upper member 14, the shorter movements effecting lapping operations only.

Where extreme precision and identity of the rollers R being simultaneously lapped are required, symmetrical distribution of the rollers may be effected between predetermined periods of lapping operations. In this method of carrying out the process of lapping, the cut-out portions 15 would be omitted or the number of rollers in the rows and the length of lapping movements of the upper member 14 would be such that rollers R would not enter the cut-out portions 15. To symmetrically rearrange the rollers R for successive lapping operations, alternate rows of the rollers R may be reversed end for end, or any other redistribution effected to regroup the rollers in a manner tending to equally distribute the larger and smaller rollers throughout the entire number of rollers being lapped. Repeated periods of lapping operations of the articles after rearranging as above described will cause the articles to be gradually and uniformly lapped to identical size and shape to an extreme precision. It will be understood that the surfaces 11 of the grooves contacting with the rollers R will be accurately formed to substantially perfect planes obliquely disposed and parallel to each other as shown.

While the present invention is primarily applicable for lapping conical rollers such as are used for anti-friction bearings of well-known type, cylindrical rollers may be lapped equally well. In either case not only is the surface of revolution of the roller lapped to precision limits but also the base or an end surface of each of the rollers are lapped simultaneously to planes normal to the axis of the roller or to curved surfaces having the same axis as the surface of revolution.

What I claim is:

1. The process of lapping surfaces of revolution of similar rollers comprising, arranging a plurality of rows of said rollers along grooves of a serrated plate, the axes of the rollers in each row being parallel to each other and substantially normal to its groove, and moving a lap over said rollers in a direction oblique to the grooves of the plate.

2. The process of lapping conical surfaces of similar frustums comprising, arranging a plurality of rows of said frustums along grooves of a serrated plate, the axes of the frustums in each row being parallel to each other and substantially normal to its groove, and moving a lap over said frustums in a direction oblique to the grooves of the plate.

3. The process of lapping surfaces of revolution of similar rollers comprising, arranging a plurality of rows of said rollers along the grooves of a parallelly serrated plate, their base surfaces being in contact with the abutting surfaces thereof, and moving a lap over said rollers in a direction to simultaneously roll them along said grooves and force their base surfaces against said abutting surfaces.

4. The process of lapping the conical surfaces of similar frustums comprising, arranging a plurality of rows of said frustums along the grooves of a serrated plate, their base surfaces being in contact with the abutting surfaces thereof, and moving a lap over said frustums in a direction oblique to the frustums to simultaneously roll them along said grooves and force their base surfaces against said abutting surfaces.

5. The process of lapping the surfaces of revolution of similar rollers comprising, arranging said rollers in rows along grooves formed in a plane, the grooves being so formed that the rollers project partially from said grooves and have their outermost element substantially in a plane, and moving a lap over said rollers in a direction oblique to said elements to simultaneously roll said rollers along said grooves and force them against a wall of said groove.

6. The process of lapping the conical surfaces of similar frustums comprising, arranging said frustums in rows and facing in the same direction along angular grooves formed in a plane, the grooves being so formed that the frustums project partially from said grooves and have their outermost elements substantially in a plane, and moving a lap over said frustums in a direction oblique to said elements to simultaneously roll said frustums along said grooves and maintain them in contact with the side walls of said grooves.

7. The process of lapping the surfaces of revolution of similar rollers comprising arranging said rollers in parallel rows and with their axes normal to spaced grooves formed in a serrated plate so that they project partially from said grooves and have their outermost elements substantially in a plane, and moving a plane surface lap over the projecting portions of said rollers.

8. The process of lapping the conical surfaces of similar frustums comprising, arranging said frustums in parallel rows and facing in the same direction within spaced grooves of a serrated plate so that they project partially from said grooves and have their outermost elements substantially in a plane, and moving a plane surface lap obliquely over the projecting portions of said frustums.

9. The process of lapping the conical and base surfaces of similar frustums comprising, arranging said frustums in rows and facing in the same direction in parallel grooves of a serrated plate, said grooves having their surfaces formed to engage elements of said conical surfaces and portions of their base surfaces, and moving a lap over the projecting portions of said frustums in directions to roll said frustums along said grooves and force their base surfaces against one of the walls thereof whereby said conical and base surfaces will be simultaneously lapped.

10. The process of lapping the conical and base surfaces of similar frustums comprising, arranging said frustums in rows and facing in the same direction in parallel grooves of a serrated plate, said grooves having their lower surfaces formed to engage elements of said conical surfaces and having abutting surfaces engaging portions of their base surfaces, and moving a lap over the projecting portions of said frustums in directions oblique to the axes of the frustums to roll said frustums along said grooves and force their base surfaces against one of the walls thereof whereby said conical and base surfaces will be simultaneously lapped in predetermined relation to each other.

11. The process of lapping the surfaces of revolution of similar rollers comprising arranging a plurality of rows of said rollers along grooves of a serrated plate, the axes of said rollers in each row being maintained parallel to each other, said serrated plate having recesses connecting adjacent grooves, and moving a lap in a direction oblique to said grooves whereby said rollers are rolled along said grooves and passed through said recesses successfully to adjacent grooves.

12. The process of lapping the conical surfaces of similar frustums comprising arranging a plurality of rows of said frustums along grooves of a serrated plate, the axes of said frustums in each row being parallel to each other, said serrated plate having recesses at opposite sides connecting the ends of adjacent grooves, and moving a lap in directions oblique to said grooves whereby said frustums are rolled along said grooves and passed through said recesses successively into adjacent grooves.

13. The process of lapping surfaces of revolution of similar rollers comprising, arranging a series of said rollers within a groove of a recessed plate, the axes of the rollers in said series being parallel to each other and substantially normal to said groove, and moving a lap over said rollers in a direction oblique to said groove.

14. The process of lapping surfaces of revolution of similar rollers comprising, arranging a series of said rollers along a groove of a recessed plate with their surfaces in contact with a side surface thereof, and moving a lap over said rollers in a direction to simultaneously roll them along said groove and force their base surfaces against said side surface thereof.

15. The process of lapping the conical surfaces of similar frustums comprising, arranging said frustums in a series and facing in the same direction within a groove of a recessed plate so that they project partially from said groove and having their outermost elements substantially in a plane, and moving a plane surface lap in a direction oblique to the axes of said frustums over the projecting portions of said frustums.

In testimony whereof, I hereto affix my signature.

WILLIAM E. HOKE.